(12) United States Patent
Dehn et al.

(10) Patent No.: US 8,417,731 B2
(45) Date of Patent: Apr. 9, 2013

(54) ARTICLE UTILIZING A GENERIC UPDATE MODULE WITH RECURSIVE CALLS IDENTIFY, REFORMAT THE UPDATE PARAMETERS INTO THE IDENTIFIED DATABASE TABLE STRUCTURE

(75) Inventors: Rene Dehn, Sinsheim (DE); Martin Kaiser, Speyer (DE); Gisella Dominguez Anzuinelli, Heidelberg-Kirchheim (DE)

(73) Assignee: SAP AG, Walldorf (DE)

( * ) Notice: Subject to any disclaimer, the term of this patent is extended or adjusted under 35 U.S.C. 154(b) by 1461 days.

(21) Appl. No.: 11/647,768

(22) Filed: Dec. 28, 2006

(65) Prior Publication Data

US 2008/0162492 A1  Jul. 3, 2008

(51) Int. Cl.
*G06F 17/30* (2006.01)

(52) U.S. Cl. ......... 707/796; 707/795; 707/802; 707/803

(58) Field of Classification Search ............... 707/1–2, 707/5–7, 100, 102, 104.1, 200–205, 795–796, 707/802–803
See application file for complete search history.

(56) References Cited

U.S. PATENT DOCUMENTS

| | | | |
|---|---|---|---|
| 5,129,082 A | 7/1992 | Tirfing et al. | |
| 5,701,453 A | 12/1997 | Maloney et al. | |
| 5,806,075 A * | 9/1998 | Jain et al. | 707/201 |
| 5,809,497 A | 9/1998 | Freund et al. | |
| 5,907,846 A | 5/1999 | Berner et al. | |
| 5,917,965 A | 6/1999 | Cahill et al. | |
| 5,974,421 A | 10/1999 | Krishnaswamy et al. | |
| 6,023,696 A | 2/2000 | Osborn et al. | |
| 6,035,294 A | 3/2000 | Fish | |
| 6,067,552 A | 5/2000 | Yu | |
| 6,078,926 A * | 6/2000 | Jensen et al. | 707/103 R |
| 6,085,189 A * | 7/2000 | Pirahesh et al. | 707/3 |
| 6,151,602 A * | 11/2000 | Hejlsberg et al. | 707/10 |
| 6,181,837 B1 | 1/2001 | Cahill et al. | |
| 6,243,709 B1 | 6/2001 | Tung | |
| 6,356,901 B1 | 3/2002 | MacLeod et al. | |
| 6,374,235 B1 | 4/2002 | Chen et al. | |
| 6,434,558 B1 * | 8/2002 | MacLeod et al. | 707/6 |
| 6,460,052 B1 | 10/2002 | Thomas et al. | |
| 6,609,123 B1 | 8/2003 | Cazemier et al. | |
| 6,636,846 B1 | 10/2003 | Leung et al. | |
| 6,668,263 B1 * | 12/2003 | Cranston et al. | 707/205 |
| 6,938,029 B1 | 8/2005 | Tien | |
| 7,085,757 B2 | 8/2006 | Dettinger et al. | |
| 7,152,073 B2 | 12/2006 | Gudbjartsson et al. | |
| 7,225,177 B2 | 5/2007 | Wu et al. | |
| 7,249,118 B2 * | 7/2007 | Sandler et al. | 707/1 |
| 7,373,393 B2 | 5/2008 | Sonoda et al. | |
| 7,383,284 B2 | 6/2008 | Heinrichs et al. | |
| 7,383,288 B2 | 6/2008 | Miloushev et al. | |
| 7,406,457 B2 | 7/2008 | Kaiser | |
| 7,409,387 B2 | 8/2008 | Dietel | |
| 7,424,685 B2 | 9/2008 | Behrens et al. | |

(Continued)

*Primary Examiner* — Srirama Channavajjala
(74) *Attorney, Agent, or Firm* — Fish & Richardson P.C.

(57) ABSTRACT

This disclosure provides various embodiments of software for identifying and utilizing a generic update module with recursive calls. In one aspect, the software receives packed update parameters for updating a data record in a database, unpacks the update parameters, and updates the data record in the database using the unpacked update parameters. In some implementations, the update parameters may comprise a packed long byte string. The software may update the data record by returning the unpacked update parameters to a business application for database execution.

7 Claims, 4 Drawing Sheets

U.S. PATENT DOCUMENTS

| | | |
|---|---|---|
| 2002/0111960 A1 | 8/2002 | Irons et al. |
| 2002/0147725 A1 | 10/2002 | Janssen et al. |
| 2003/0204450 A1 | 10/2003 | Heinrichs et al. |
| 2003/0204480 A1 | 10/2003 | Heinrichs et al. |
| 2004/0193087 A1 | 9/2004 | Albus et al. |
| 2005/0010606 A1 | 1/2005 | Kaiser et al. |
| 2005/0019854 A1 | 1/2005 | Gross et al. |
| 2005/0060286 A1 | 3/2005 | Hansen et al. |
| 2005/0086201 A1 | 4/2005 | Weddeling et al. |
| 2005/0097568 A1 | 5/2005 | Behrens et al. |
| 2005/0108237 A1 | 5/2005 | Sonoda et al. |
| 2005/0108272 A1 | 5/2005 | Behrens et al. |
| 2005/0149584 A1* | 7/2005 | Bourbonnais et al. ........ 707/204 |
| 2005/0278395 A1 | 12/2005 | Sandaire |
| 2005/0289020 A1 | 12/2005 | Bruns et al. |
| 2006/0020578 A1 | 1/2006 | Hood |
| 2006/0047622 A1 | 3/2006 | Folkert et al. |
| 2006/0074914 A1 | 4/2006 | Kaiser |
| 2006/0074979 A1 | 4/2006 | Kaiser |
| 2006/0085372 A1 | 4/2006 | Kaiser |
| 2006/0136481 A1 | 6/2006 | Dehn et al. |
| 2006/0253470 A1* | 11/2006 | Friedman et al. ............. 707/100 |
| 2006/0288036 A1 | 12/2006 | Sadovsky et al. |
| 2007/0005552 A1 | 1/2007 | Klein et al. |
| 2007/0005599 A1 | 1/2007 | Klein et al. |
| 2007/0005640 A1 | 1/2007 | Klein et al. |
| 2007/0005666 A1 | 1/2007 | Klein et al. |
| 2007/0097076 A1 | 5/2007 | Gross |
| 2007/0100868 A1 | 5/2007 | Hackmann |
| 2007/0162468 A1 | 7/2007 | Dentzer et al. |
| 2007/0271161 A1 | 11/2007 | Kaiser |
| 2007/0282858 A1 | 12/2007 | Arner et al. |
| 2008/0033907 A1 | 2/2008 | Woehler et al. |
| 2008/0154950 A1 | 6/2008 | Gross |
| 2008/0162205 A1 | 7/2008 | Gross |
| 2008/0162207 A1 | 7/2008 | Gross et al. |
| 2008/0162415 A1 | 7/2008 | Kaiser et al. |
| 2008/0162457 A1* | 7/2008 | Dehn et al. ........................ 707/5 |
| 2008/0162563 A1 | 7/2008 | Gross et al. |
| 2008/0162616 A1 | 7/2008 | Gross et al. |
| 2008/0162777 A1 | 7/2008 | Kaiser et al. |

* cited by examiner

ARTICLE UTILIZING A GENERIC UPDATE MODULE WITH RECURSIVE CALLS IDENTIFY, REFORMAT THE UPDATE PARAMETERS INTO THE IDENTIFIED DATABASE TABLE STRUCTURE

TECHNICAL FIELD

This disclosure generally relates to data access and presentation and, more specifically, to systems and methods utilizing a generic update module with a recursive call.

BACKGROUND

Database interconnectivity has become a common feature of many enterprise systems. In such systems, multiple users and/or applications may request information from associated databases for processing and manipulating the data therein. In some instances, the user and/or application may make changes to the data records such that the information originally requested no longer correctly represents the data that should be stored in the database. In these situations, the user and/or application may not be making the changes directly to the database from which the information was requested, instead modifying the data locally. This environment may be one in which multiple users and/or applications request data from similar locations such that multiple changes are made to a single source of data. In order to prevent the corruption of data from inconsistent changes by users and/or applications, many systems offer persistence as a standard feature. Database locks and other features of database systems prevent multiple users and/or applications from making concurrent transactions to a data record such that conflicts in the database arise.

Database systems may execute database updates and maintain persistence through the use of an update module. While useful, systems normally require that the module be defined strictly to the data structure of the database that the module will be updating. As such, each database typically requires a new update module to be defined specific to that individual database's structure. Accordingly, when multiple databases reside in a system, defining multiple update modules often becomes a time- and resource-consuming task.

SUMMARY

This disclosure provides various embodiments of software for identifying and utilizing a generic update module with recursive calls. In one aspect, the software receives packed update parameters for updating a data record in a database, unpacks the update parameters and updates the data record in the database using the unpacked update parameters. For example, the update parameters may comprise a packed long byte string. In another example, the software may be executed to receive second packed update parameters for updating a second data record in a database where the second data record is in a second database table, unpack the second update parameters, and update the second data record in the database using the unpacked second update parameters. In yet another example, the software may update a second data record where the second data record is in a second database. In some implementations, updating the data record may be performed by providing the unpacked update parameters to an update task for database execution.

The foregoing example software—as well as other disclosed processes—may also be computer implementable methods. Moreover, some or all of these aspects may be further included in respective systems or other devices for identifying and utilizing a generic database query. The details of these and other aspects and embodiments of the disclosure are set forth in the accompanying drawings and the description below. Other features, objects, and advantages of the various embodiments will be apparent from the description and drawings, as well as from the claims.

DETAILED DESCRIPTION

Figure 1:
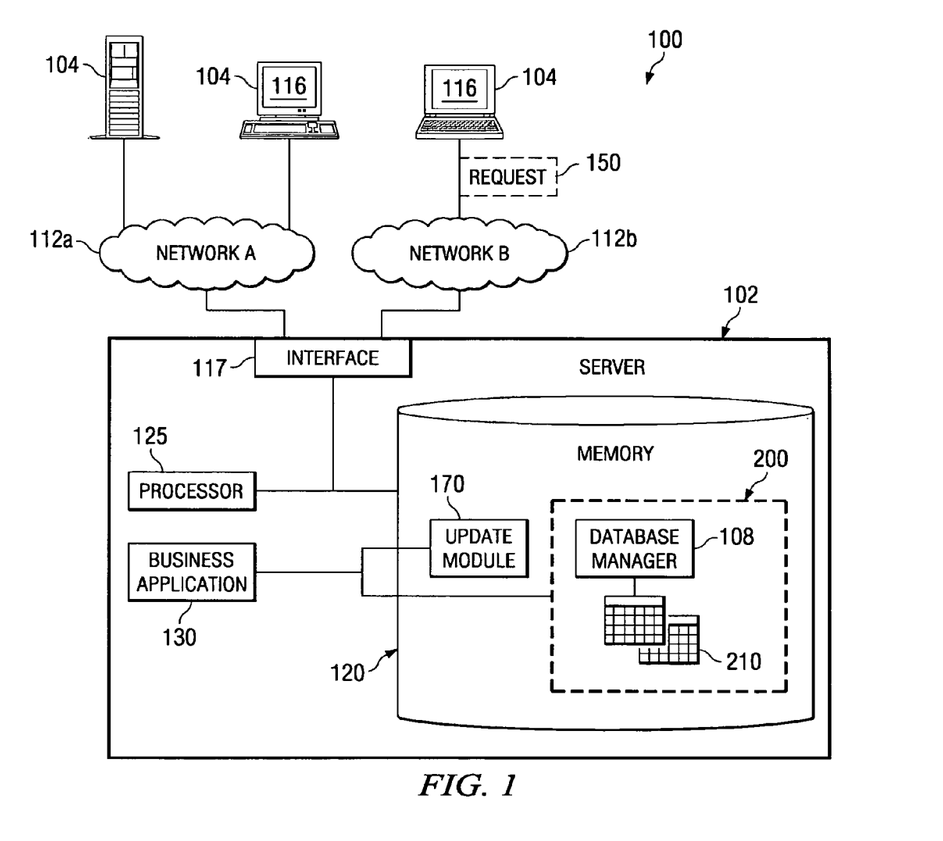
FIG. 1 illustrates a database environment implementing a generic update module according to a particular implementation of the present disclosure.

FIG. 1 illustrates a database environment 100 for storing or retrieving (or otherwise managing) information in at least a portion of enterprise or data processing environment. In accordance with particular implementations, data environment 100 utilizes a generic update module 170 with recursive calling to update the database tables 210 located in a database 200, which is often a relational database. In certain embodiments, environment 100 provides a generic update module 170 such that data records stored in a plurality of database tables 210 of database 200 may be updated through the use of one update module 170. For example, the user or application may initiate modifications to be made to various data records of various database tables 210. In this example, environment 100 allows modifications such as inserts, updates, and deletes to be performed via recursive calls to the generic update module 170. More specifically, environment 100 allows multiple instances of the generic update module 170 to accept modifications made to a plurality of data records and subsequently execute or prepare the necessary database operations upon the plurality of database tables 210, regardless of the individual table's defined structure. As such, users and applications may call the generic update module 170 for modification tasks without being required to declare new update modules with parameters specific to the structure of each database table 210.

Environment 100 may be a distributed client/server system that allows clients 104 to submit requests to store and/or retrieve information from database 200 maintained on server 102. But environment 100 may also be a standalone computing environment or any other suitable environment, such as an administrator accessing data stored on server 102, without departing from the scope of this disclosure.

In the illustrated embodiment, server 102 includes memory 120 and processor 125 and comprises an electronic computing device operable to receive, transmit, process and store data associated with environment 100. For example, server 102 may be any computer or processing device such as a mainframe, a blade server, general-purpose personal computer (PC), Macintosh, workstation, Unix-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, environment 100 can be implemented using computers other than servers, as well as a server pool. Server 102 may be adapted to execute any operating system 110 including z/OS, Linux-Intel or Linux/390, UNIX, Windows Server, or any other suitable operating system. According to one embodiment, server 102 may also include or be communicably coupled with a web server and/or an SMTP server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes database 200 and update module 170. When the database is stored in relational format, environment 100 may allow access to database 200 using a structured query language (SQL), which may include any of the plurality of versions of the SQL relational database query and manipulation language such as, for example, SEQUEL, ANSI SQL, any other proprietary or public variant of SQL, or other suitable or generic query language (such as eXtensible Markup Language (XML)). Database 200 may include or be communicably coupled with a database manager 108, which is generally any set of logical instructions executed by processor 125 to perform tasks associated with database management and/or responding to queries, including storing information in memory 120, searching database 200, generating responses to queries using information in database 200, and numerous other related tasks. In particular embodiments, database manager 108 accesses database tables 210 in response to queries from clients 104.

Server 120 may also include, reference, or communicate with update module 170. In certain implementations, update module 170 may correspond to a function module containing the update data and, in some cases, error information that may be generated if the update is cancelled. When the update module 170 is executed, the corresponding database 200 may be locked in order to maintain data integrity such that if a runtime error occurs, the database 200 may be rolled back to its state prior to the update execution. Due to the lock, simultaneous changes to the objects to be updated are not possible in some cases. Different instances of environment 100 may perform the update process using update module 170 in different manners. One example of the update process may begin with a signal from environment 100 indicating that local updating of data records is complete. The signal may be the COMMIT WORK statement signifying the closing of a transaction in environment 100. In that example, update module 170 is called upon receiving the COMMIT WORK statement. A COMMIT statement may then be sent to database 200 such that database locks are created to protect the integrity of the data. Once the update module 170 causes the database 200 to be updated, the task releases the database locks and the update is complete. These updates may be synchronous or asynchronous. For example, with synchronous updates, the program (such as business application 130 described below) that outputs the statement COMMIT WORK AND WAIT waits until the update module 170 outputs the status of the update. The program can then respond to errors separately. In another example, with asynchronous updates, the program that outputs the statement COMMIT WORK passes the update onto update module 170 and does not wait for the update process to respond.

Update module 170 is typically software and may be written or described in any appropriate computer language including, for example, C, C++, Java, Visual Basic, assembler, Perl, ABAP, any suitable version of 4GL, or any combination thereof. As used herein, software generally includes any appropriate combination of software, firmware, hardware, and/or other logic. It will be understood that while update module 170 is illustrated in FIG. 1 as a single multitasked module, the features and functionality performed by this engine may be performed by multiple modules such as, for example, one or more agents or database instances. Further, while illustrated as internal to server 102, one or more processes associated with update module 170 may be stored, referenced, or executed remotely. Moreover, update module 170 may be a child or sub-module of another software module (such as database 200) without departing from the scope of this disclosure. In one embodiment, update module 170 may be referenced by or communicably coupled with applications executing on or presented to client 104.

Server 102 also includes processor 125, which executes instructions (such as the logic or software described above) and manipulates data to perform the operations of server 102 such as, for example, a central processing unit (CPU), a blade, an application specific integrated circuit (ASIC), or a field-programmable gate array (FPGA). In particular, processor 125 performs any suitable tasks associated with database manager 108. Although FIG. 1 illustrates a single processor 125 in server 102, multiple processors 125 may be used according to particular needs and reference to processor 125 is meant to include multiple processors 125 where applicable.

Server 102 may also include or reference a local, distributed, or hosted business application 130. In certain embodiments, business application 130 may request access to retrieve, modify, delete, or otherwise manage the information of one or more databases 200 in memory 120. Specifically, business application 130 may use update module 170 to update data records stored in the database tables 210 as requested by the user and/or application. Business application 130 may be considered business software or solution that is capable of interacting or integrating with databases 200 located, for example, in memory 120 to provide access to data for personal or business use. An example business application 130 may be a computer application for performing any suitable business process by implementing or executing a plurality of steps. One example of a business application 130 is one that may provide interconnectivity with one or more database tables 210 containing inventory or employee information such that records may be dispersed among a plurality of database tables 210. As a result, business application 130 may provide a method of accessing requested data from a plurality of database tables 210 and modifying data records of at least one database table 210 such that the modifications will be executed through use of the generic update module 170. Business application 130 may also provide the user with computer implementable techniques of updating the information contained in the plurality of database tables 210 such that users may insert, update, and/or delete database records for a plurality of database tables 210 without requiring the declaration of each individual table's specific parameters to the associated update module 170.

Server 102 may also include interface 117 for communicating with other computer systems, such as client 104, over network 112 in a client-server or other distributed environment. In certain embodiments, server 102 receives requests 150 for data access from local or remote senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Indeed, while illustrated as two networks, 112a and 112b respectively, network 112 may be a continuous network without departing from the scope of this disclosure, so long as at least portion of network 112 may facilitate communications between senders and recipients of requests 150 and results. In other words, network 112 encompasses any internal and/or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any local or remote computing device operable to receive requests from the user via a user interface 116, such as a GUI, a CLI (Command Line Interface), or any of numerous other user interfaces. Thus, where reference is made to a particular interface, it should be understood that any other user interface may be substituted in its place. In various embodiments, each client 104 includes at least GUI 116 and comprises an electronic computing device operable to receive, transmit, process and store any appropriate data associated with environment 100. It will be understood that there may be any number of clients 104 communicably coupled to server 102. For example, illustrated clients 104 include one local client 104 and two clients external to the illustrated portion of enterprise 100. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review queries via GUI 116. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely GUI 116.

GUI 116 comprises a graphical user interface operable to allow the user of client 104 to interface with at least a portion of environment 100 for any suitable purpose. Generally, GUI 116 provides the user of client 104 with an efficient and user-friendly presentation of data provided by or communicated within environment 100. GUI 116 may provide access to the front-end of business application 130 executing on client 104 that is operable to update the data records of database tables 210 using the generic update module 170. In another example, GUI 116 may display output reports such as summary and detailed reports. GUI 116 may comprise a plurality of customizable frames or views having interactive fields, pull-down lists, and buttons operated by the user. In one embodiment, GUI 116 presents information associated with queries 150 and buttons and receives commands from the user of client 104 via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in environment 100 and efficiently presents the results to the user. Server 102 can accept data from client 104 via the web browser (e.g., Microsoft Internet Explorer or Mozilla Firefox) and return the appropriate HTML or XML responses using network 112. For example, server 102 may receive such an SQL query from client 104 using the web browser and then execute the parsed query to store and/or retrieve information in database 200.

Figure 2A:
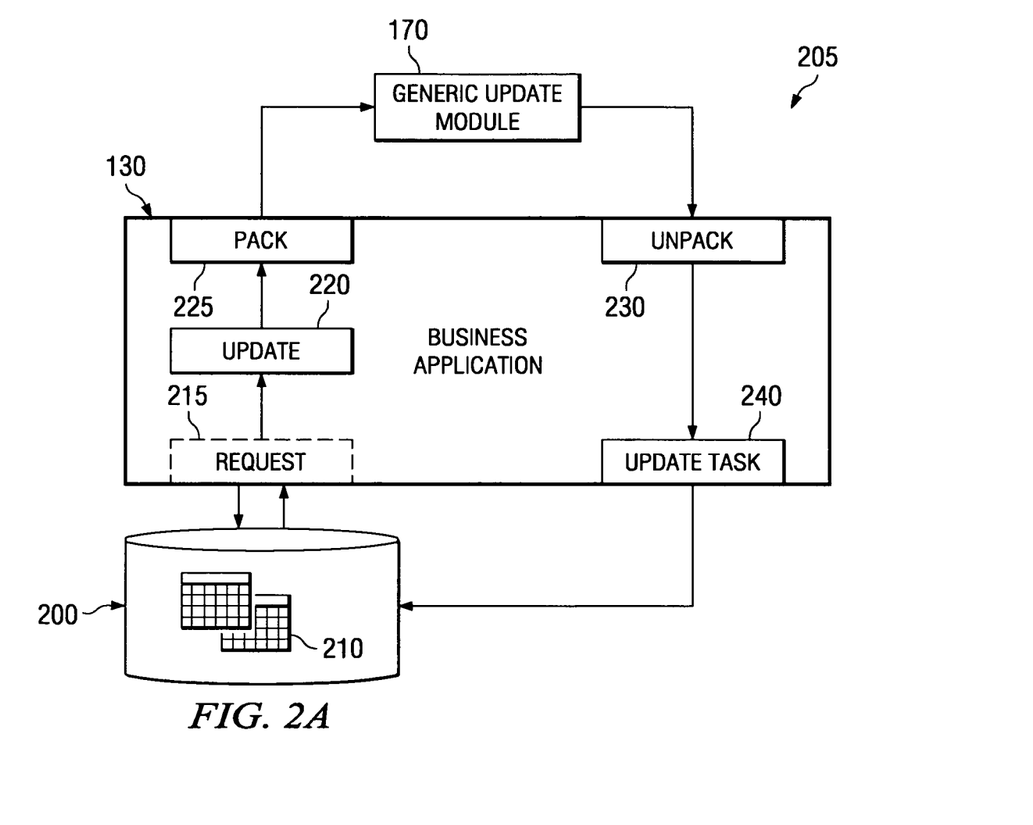
FIG. 2A is a diagram illustrating an example technique for updating a database table through the interaction of the generic update module, business application, and database of the illustrated environment of FIG. 1.
Figure 2B:
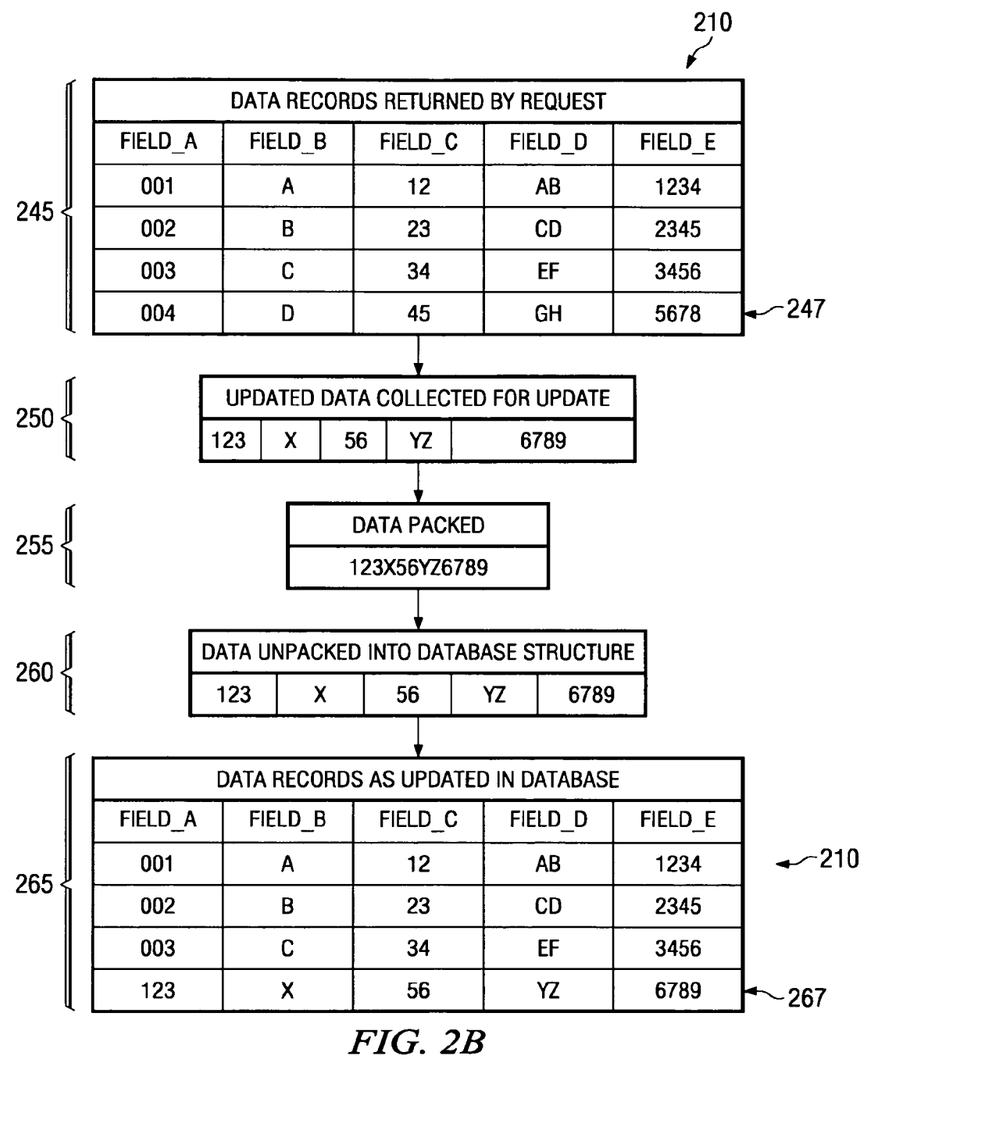
FIG. 2B illustrates an example flow of data through the steps of the generic update module technique of FIG. 2A.

FIG. 2A illustrates one embodiment of the high-level components of the generic update module system. Corresponding FIG. 2B illustrates the data flow of an example record as it moves through the embodiment of FIG. 2A. Specifically, the three components represented in FIG. 2A are database 200 (and the plurality of database tables 210 stored therein), business application 130, and the generic update module 170. In this embodiment, database 200 is part of a persistent environment. When in a persistent environment, changes made to the data records of database tables 210 by business application 130 will not be reflected in the database 200 until an update task is performed and the system is synchronized such as via a COMMIT command.

As discussed above, business application 130 is communicably coupled with database 200 and is capable of interacting with the plurality of database tables 210 stored therein. The connection between database 200 and business application 130 allowing the interaction may be created using Open Database Connectivity (ODBC), Java Database Connectivity (JDBC), OLE DB, or any other suitable database connectivity protocol or technique. Upon establishing (or verifying) the connection, data from database 200 may be accessed through commands and statements sent by business application 130. In the illustrated embodiment, interaction with database 200 occurs when business application 130 requests data 215 from or provides data 215 to one or more of the plurality of database tables 210. Request 215 may be a query embodied in SQL or another suitable query language and the data records requested may store any suitable data relevant to business application 130. For example, step 245 of FIG. 2B illustrates an example of data records returned to the business application 130 in response to request 215. For illustrative purposes, FIG. 2B follows data record 247 from step 245 throughout the update technique of FIG. 2A.

Upon receiving data records in response to request 215, business application 130 may present the data to the user, process appropriate calculations on the data, or perform other operations within the capabilities of business application 130. In this example, business application 130 may act upon the retrieved data records such that the records are updated 220.

"Update" may be understood to include the update, deletion, addition, or general modification of the initial set of data records received from request 215. In this embodiment, the data records have been updated by business application 130 to reflect data that has changed since the previous version of database table 210 was created. Step 250 of FIG. 2B shows the example data record 247 after it has been updated by business application 130.

After updating the data records but prior to sending them to the generic update module 170, business application 130 processes the data by packing 225 the updated parameters of the data record. "Packing" the data records may be understood to include removing extra terms, removing empty spaces, using a compression algorithm, storing the parameters in character containers, storing the parameters in a cluster table within the business application 130, or other methods of processing. FIG. 2B illustrates the effect of packing the data in step 255. As an example, step 255 may represent the update parameters as stored in a cluster table internal to the business application 130. In such an example, the parameters may be declared as cluster tables, which may indicate that the actual data records are packed into a long byte string. More particularly, the long byte string can be an uninterpreted byte string of any length. In some cases, fields of this type may be located at the end of transparent tables.

Returning to FIG. 2A, after having packed 225 the data records, the generic update module 170 may be called by business application 130. Generally, update modules must be defined such that the parameters of the module match the parameters of the corresponding database structure. The generic update module 170, however, may be defined such that the parameters of the module are defined to correspond to the format that the update parameters have been packed 225 into by business application 130. By formatting the generic update module 170 in this method, the module may accept packed update parameters from a plurality of database tables 210 having a plurality of database table layouts. Additional instances of the generic update module 170 may then be called to update other updated data records as required by business application 130.

In the embodiment of FIG. 2A, once the packed update parameters are sent to the generic update module 170, the module may act as a dispatcher, sending the packed update parameters to an unpacking module or process 230 of business application 130. Upon reaching the unpacking module 230, data from the cluster tables may be used to restore the update parameters to their database record structure. FIG. 2B illustrates the data being restored to its database structure form at step 260 such that it may later be used to update the corresponding database table 210 from where it originated. In alternative embodiments, the generic update module 170 may perform the unpacking process instead of the unpacking module 230. In another alternative embodiment, the unpacking module 230 may not be located within the business application 130 and may instead be located in an external software application or module.

Returning to the particular embodiment of FIG. 2A, once the update parameters have been unpacked into their original database structure, the business application 130 calls an update task 240 to complete the update. The update task 240 may execute the database operations such that the updated data records are inserted into database table 210 of database 200, overwriting or supplementing the data records previously stored therein. The update task 240 may be executed internally by the business application 130, or in an alternative embodiment, by the generic update module 170. In other embodiments, the update task 240 may be performed by an external application or module. Step 265 of FIG. 2B illustrates database table 210 after the update task 240 has been executed. The data updated initially in step 250 is now reflected as data record 267 stored within database 210. Data record 267 in FIG. 2B may be a data record which was overwritten by the update parameters in the update task 240. In other embodiments, it may be a new data record inserted by the update task 240. In another alternative embodiment, the data record corresponding to the update parameters in steps 250 and 260 may be deleted by the update task 240 such that the data record 267 shown in table 210 of FIG. 2B does not exist.

Returning to FIG. 2A, it may be understood that business application 130, whether after having performed the preceding operation or during the performance thereof, may interact with other data records from the same table or others in the plurality of database tables 210 and databases 200. For each operation, a new instance of the generic update module 170 may be used to facilitate the data record update performed in FIG. 2A.

Figure 3:
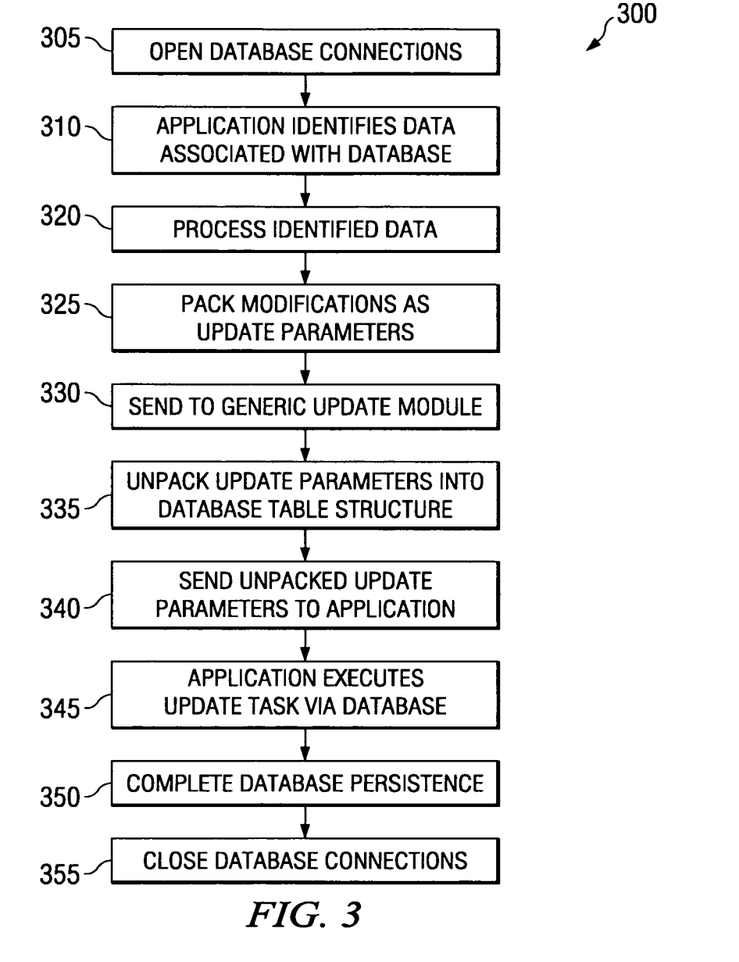
FIG. 3 is a flowchart diagram illustrating the steps of another example generic update technique utilized by the illustrated environment of FIG. 1.

FIG. 3 is a flowchart diagram illustrating an alternative embodiment of the update method 300 from the view of the business application 130 shown in FIG. 1. As described above, the update module 170 may be called recursively by a user and/or application in order to provide a generic method for updating changes to a set of data records such that changes made locally may be stored persistently in a central repository. Regardless of the particular hardware or software architecture used, method 300 is generally capable of updating data records from database tables of varying structures without requiring repetitious modifications to the update module 170 associated with the modified data records. The following description of the flowchart illustrating update method 300 focuses on the operation of the business application 130 and the update module 170, or their components or sub-modules, in performing one of their respective methods or processes. But environment 100 contemplates using any appropriate combination and arrangement of logical elements implementing some or all of the described functionality.

At step 305, the business application 130 opens at least one database connection to one or more databases 200. The database connections may be created using Open Database Connectivity (ODBC), Java Database Connectivity (JDBC), OLE DB, or any other suitable database connectivity protocol or technique. Once a connection between business application 130 and database 200 has been created and opened, the business application 130, either automatically or through user action, identifies data associated with one or more database tables 210 found in database 200 at step 310. In some instances, data records may be retrieved from more than one database 200. Data records may be requested using a query defined by the business application 130 or specified by a user of the application 130. The query itself may be written in SQL or a variation thereupon, as well as another suitable query language. Database manager 108 may receive and process the query, returning to business application 130 the data records of the specified database tables 210 satisfying the criteria of the request. In another example, application 130 may identify that data belongs as a new record in the particular database table 210.

Upon identifying the data, business application 130 processes the (logically) local instance of the data at step 320. Such updating may include the creation, update, deletion, addition, normalizing, mapping, or other modification to the initial set of data identified by business application 130. In some cases, the business application 130 may update the data records through programmed calculations or permutations. In other cases, users of business application 130 may make manual updates to the data via the GUI 116 of a computer or workstation as shown in FIG. 1. Once the user and/or application finish processing the data, the business application 130 sends the appropriate update parameters for the processed data to be packed at step 325. "Packing" the data records may be understood to include removing extra terms, removing empty spaces, using a compression algorithm, storing update parameters in character containers, and storing the parameters in a cluster table within the business application 130, as well as other methods. When packed, updated data records may be sent to the generic update module 170 using a consistent format such that multiple instances of the generic update module 170 may be recursively called. The consistent format of packed data records may allow method 300 to avoid requiring uniquely defined update modules for each database layout. The packing of step 325 may be performed internally by the business application 130, externally by another application or function, or by the generic update module 170.

When the packing of step 325 is complete, the packed update parameters may be delivered to the generic update module 170 at step 330. The generic update module 170, configured to include or have some intelligence on the structure of the packed update parameters of step 325, receives the packed data. Generic update module 170 identifies the appropriate database structure and then unpacks the update parameters into their corresponding database table structure at step 335. In doing so, the generic update module 170 prepares the update parameters for (relatively) permanent storage in their proper database table 210. In other embodiments, the generic update module 170 may return the packed update parameters to the business application 130 where they may then be unpacked. In such embodiments, the generic update module 170 acts as a dispatcher for the update process by implementing at least part of a bridging technique to push data into various application tasks. In still another alternative, the generic update module 170 may allow the packed update parameters to be unpacked by an external module or function, which may then provide the unpacked update parameters back to the generic update module 170 or, alternatively, to the business application 130.

Returning to example method 300, generic update module 170 may provide the unpacked update parameters in database table structure back to the business application 130 at step 340. Retrieving the update parameters, the business application may then execute an update task in which the update parameters may be permanently stored into their corresponding database table 210 at step 345. The update task may execute database operations such as UPDATE, INSERT, or DELETE. Upon completion of the database operation, the updates to the data records performed by business application 130 in step 320 may be pushed throughout the persistent environment such that all users and applications accessing database tables 210 of database 200 view the records as updated by method 300. After completion of the persistent update, method 300 ends by closing the previously opened database connections at step 355.

The preceding flowchart and accompanying description illustrate exemplary method 300, as well as example dataflow diagrams. Environment 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, environment 100 may use methods with additional steps, fewer steps, and/or different steps, so long as the methods remain appropriate. Although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. An article comprising software for updating a database, the software comprising instructions stored on a tangible computer readable medium and operable when executed by a processor to:
   receive update parameters from a business application for updating a data record in a database, the update parameters packed in a generic format comprising a packed long byte string and independent of a particular database table structure, wherein the data record is associated with a database table;
   identify a database table structure associated with the database table;
   reformat the update parameters into the identified database table structure; and
   return the reformatted update parameters to the business application for storage in the database.

2. The article of claim 1, wherein the long byte string represents one or more cluster tables.

3. The article of claim 1 wherein the data record is a first data record, the update parameters are first update parameters, the packed long byte string is a first packed long byte string, the database table is a first database table, the database table structure is a first database table structure, the software further operable when executed to:
   receive second update parameters from the business application for updating a second data record in the database, the second update parameters packed in the generic format comprising a second packed long byte string and independent of a particular database table structure, wherein the second data record is associated with a second database table;
   identify a second database table structure associated with the second database table, the second database table structure disparate from the first database table structure;
   reformat the second update parameters into the second database table structure; and
   return the reformatted second update parameters to the business application for storage in the database.

4. The article of claim 1 wherein the data record is a first data record, the update parameters are first update parameters, the packed long byte string is a first packed long byte string, the database table is a first database table, the database table structure is a first database table structure, the database is a first database, the software further operable when executed to:
   receive second update parameters from the business application for updating a second data record in a second database, the second update parameters packed in the generic format comprising a second packed long byte string and independent of a particular database table structure, wherein the second data record is in a second database table;

identify a second database table structure associated with the second database table, the second database table structure disparate from the first database table structure;

reformat the second update parameters into the second database table structure; and returning the reformatted second update parameters to the business application for storage in the database.

5. The article of claim 1, wherein the database resides in a persistent environment.

6. The article of claim 1, wherein updating a data record comprises inserting, updating, or deleting the data record.

7. The article of claim 1, wherein the business application stores the reformatted update parameters in the database by:

issuing a commit statement to the database;

transferring the reformatted update parameters to the database for updating within the database.

\* \* \* \* \*

UNITED STATES PATENT AND TRADEMARK OFFICE
CERTIFICATE OF CORRECTION

| | | |
|---|---|---|
| PATENT NO. | : 8,417,731 B2 | Page 1 of 1 |
| APPLICATION NO. | : 11/647768 | |
| DATED | : April 9, 2013 | |
| INVENTOR(S) | : Dehn et al. | |

It is certified that error appears in the above-identified patent and that said Letters Patent is hereby corrected as shown below:

On the title page, item [54] and in the specification, column 1, Title, should read:

-- SYSTEM AND METHOD UTILIZING A GENERIC UPDATE MODULE WITH RECURSIVE CALLS --

Signed and Sealed this
Eleventh Day of February, 2014

Michelle K. Lee
*Deputy Director of the United States Patent and Trademark Office*